US009013450B1

(12) United States Patent
Afzal et al.

(10) Patent No.: US 9,013,450 B1
(45) Date of Patent: Apr. 21, 2015

(54) IR TOUCH

(71) Applicants: Rebecca Afzal, Perrysburg, OH (US); Victoria Wedding Kurtz, Toledo, OH (US); Daniel Keith Wedding, Toledo, OH (US); Carol Ann M Wedding, Toledo, OH (US); Jeffrey W. Guy, Toledo, OH (US)

(72) Inventors: Rebecca Afzal, Perrysburg, OH (US); Victoria Wedding Kurtz, Toledo, OH (US); Daniel Keith Wedding, Toledo, OH (US); Carol Ann M Wedding, Toledo, OH (US); Jeffrey W. Guy, Toledo, OH (US)

(73) Assignee: Imaging Systems Technology, Inc., Toledo, OH (US)

( * ) Notice: Subject to any disclaimer, the term of this patent is extended or adjusted under 35 U.S.C. 154(b) by 64 days.

(21) Appl. No.: 13/792,755

(22) Filed: Mar. 11, 2013

Related U.S. Application Data

(63) Continuation-in-part of application No. 10/975,480, filed on Oct. 29, 2004, now Pat. No. 8,400,406.

(60) Provisional application No. 60/516,294, filed on Nov. 3, 2003.

(51) Int. Cl.
    *G06F 3/042* (2006.01)
(52) U.S. Cl.
    CPC .................................... *G06F 3/042* (2013.01)
(58) Field of Classification Search
    USPC .......................................... 345/175, 173, 104
    See application file for complete search history.

(56) References Cited

U.S. PATENT DOCUMENTS

| 4,469,713 | A  | * | 9/1984  | Schwiecker et al. | ............ 427/10 |
| 4,697,881 | A  | * | 10/1987 | Brown | ......................... 359/613 |
| 5,589,402 | A  | * | 12/1996 | Ramsey et al. | ................. 438/64 |
| 5,727,049 | A  | * | 3/1998  | Sato | ........................... 379/93.17 |
| 5,785,439 | A  | * | 7/1998  | Bowen | ......................... 400/472 |
| 6,107,938 | A  | * | 8/2000  | Du et al. | .................... 340/12.22 |
| 6,961,051 | B2 | * | 11/2005 | Weindorf et al. | ............. 345/175 |
| 2005/0174747 | A1 | * | 8/2005 | Murata et al. | ................. 361/785 |

* cited by examiner

*Primary Examiner* — William Boddie
*Assistant Examiner* — Leonid Shapiro
(74) *Attorney, Agent, or Firm* — Donald K. Wedding

(57) ABSTRACT

A Photoelectric sensing array system with daughter boards daisy chained together so that varying size touch systems can be modularly constructed using the same electronics. The system also provides for increased touch resolution.

19 Claims, 13 Drawing Sheets

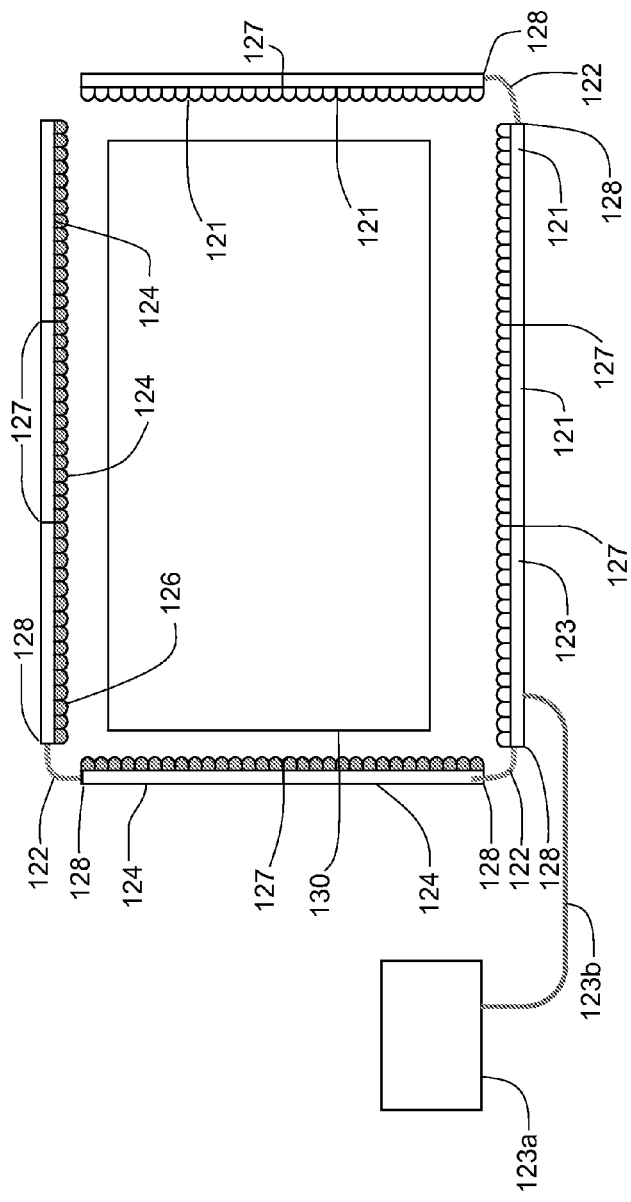
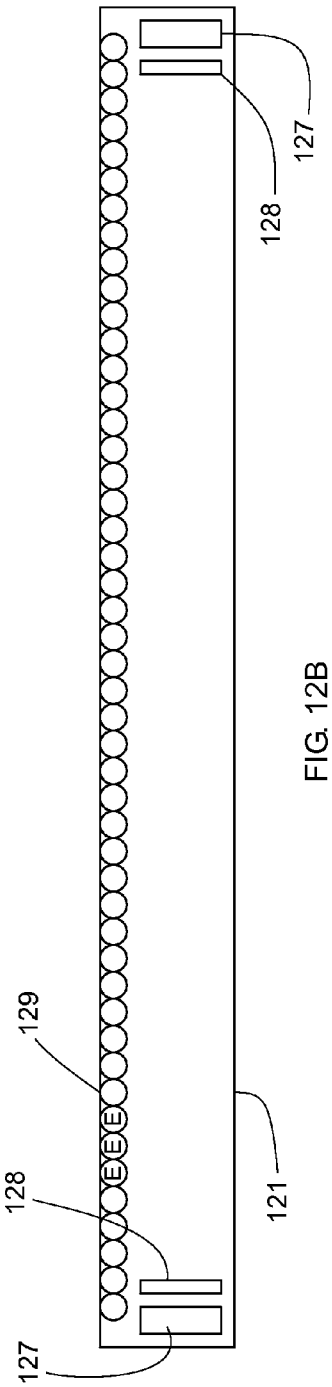

IR TOUCH

RELATED APPLICATIONS

This application is a division and continuation-in-part under 35 U.S.C. 120 of U.S. patent application Ser. No. 10/975,480 filed Oct. 29, 2004 to be issued as U.S. Pat. No. 8,400,406, which claims priority under 35 USC 119(e) for Provisional Application Ser. No. 60/516,294, filed Nov. 3, 2003, all incorporated herein by reference.

BACKGROUND OF THE INVENTION

This invention relates to a photoelectric sensing array system, method and apparatus for a touch input device or touch screen. Touch screens are often used in conjunction with a display as an input device to a computer display, a kiosk display, or other display application. The touch screen device is typically a finger as shown in FIG. 1. Other touch means may be employed such as a pointer, pencil, or other object.

There are different types of touch screens available including infrared, resistive, capacitive, and acoustic wave. This invention relates to infrared touch screens. Infrared touch screens comprise an array of infrared photo emitters, each paired with an array of infrared (IR) photo detectors.

The position of an opaque object located between the transmitting array and the receiving array is determined by individually pulsing the infrared photo emitter sources while electronically sensing the response of the corresponding photo detectors.

The IR prior art discloses arrays that produce a multitude of invisible light beams, whereby corresponding sensors are blocked at the position where an opaque object is located. The center of the opaque object can be determined by electronically sensing current flow in each of the photo sensors, and then computing the center point of the region of blocked photosensors. Commonly this IR detection process is done in two axes simultaneously to create a two dimensional sensing grid such as found on a computer touch screen as shown in FIG. 1.

In the IR prior art, the sensor arrays of this type have the light emitting transmitters mounted on one side and the photo detecting receivers mounted on the opposite side. See U.S. Pat. No. 4,672,364 (Lucas); U.S. Pat. No. 4,841,141 (Ouchi); U.S. Pat. No. 4,891,508 (Campbell); U.S. Pat. No. 4,893,120 (Doering et al); U.S. Pat. No. 4,904,857 (Ando et al); U.S. Pat. No. 4,928,094 (smith); U.S. Pat. No. 5,162,783 (Moreno) and U.S. Pat. No. 5,579,035 (Beiswenger), which are each incorporated herein by reference.

Technical and manufacturing improvements in the production of displays such as LCD, plasma, and rear projection have made available large area displays. Large displays are desirable in applications such as dynamic signage, kiosks, lobby portholes, and games. These large displays require large touch screens to provide a large interactive display surface.

The development and production of large touch screens is complex. Resistive and capacitive touch screens are not easy to fabricate in large sizes due to poor yield. Similarly, acoustic wave attenuates with large touch systems size. Infrared touch screens are more readily scaled to large sizes than other touch system technologies. However, problems such as alignment of sensors, resolution, mean time between failures and manufacturability are magnified with increasing size.

SUMMARY OF INVENTION

In accordance with this invention, there is provided a new and improved photoelectric sensing array system, method and apparatus for large area IR touch screens to increase the resolution of the array, to improve ease of manufacture and testing, and to increase mean time between failure.

BRIEF DESCRIPTION OF DRAWINGS

FIGS. 12A and 12B are a configuration of boards daisy chained together to form a large touch screen.

DETAILED DESCRIPTION OF THE DRAWINGS

Figure 1:
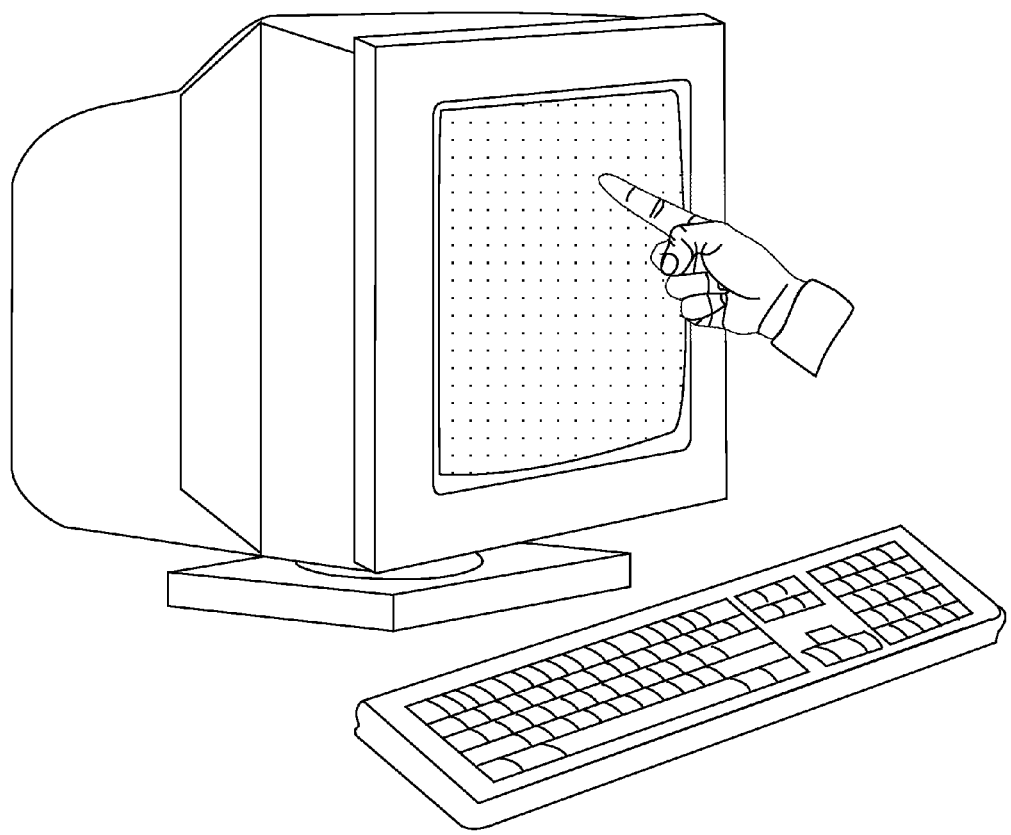
FIG. 1 illustrates a touch screen being used over a computer monitor.

As noted above, FIG. 1 shows a touch screen being used with a finger.

Figure 2:
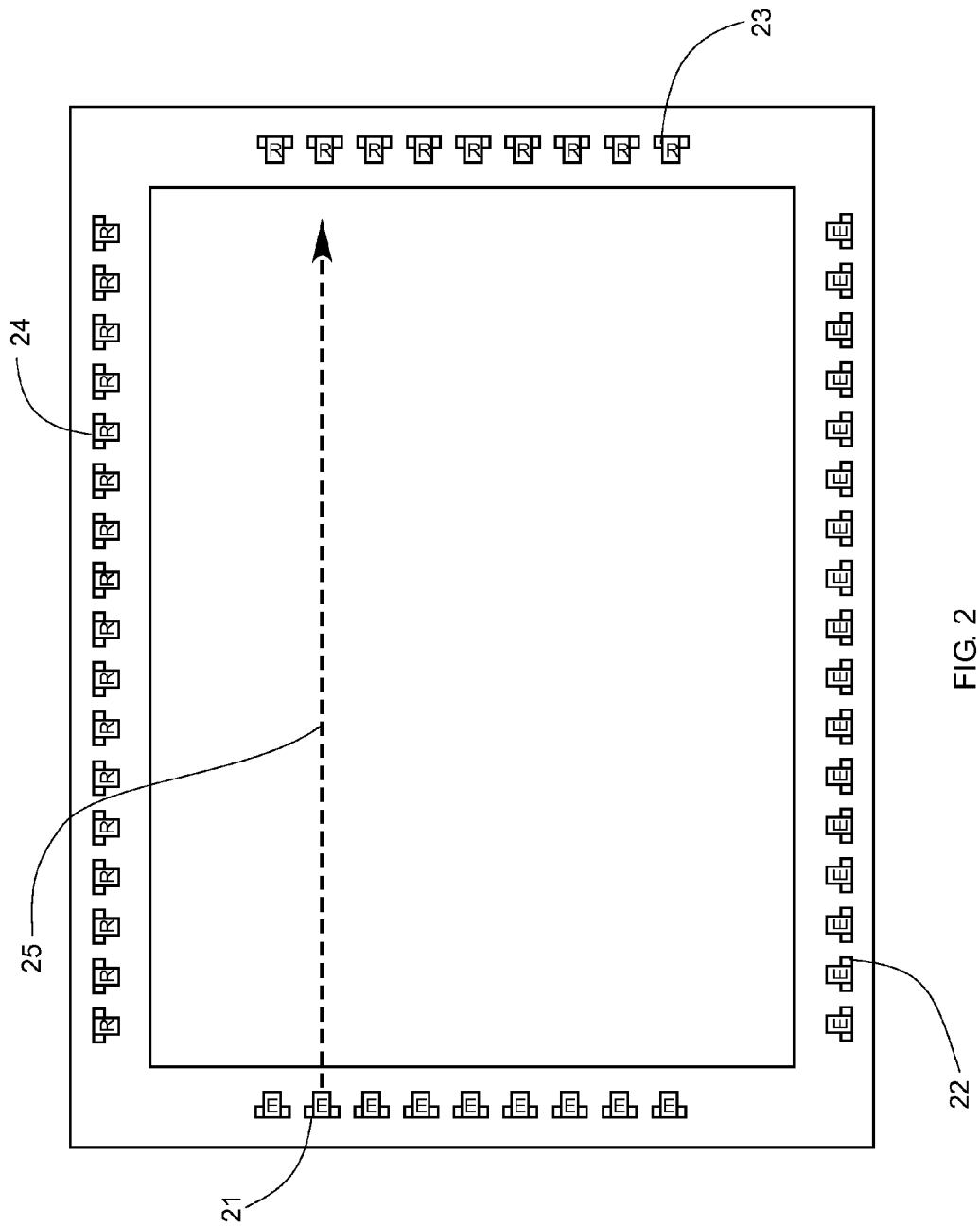
FIG. 2 is a prior art diagram of an infrared (IR) touch matrix.

FIG. 2 is a prior art diagram of a touch screen array using surface mounted infrared receivers R and emitters E. The infrared receivers R and emitters E are arranged to form a grid. Each Y axis emitter E (21) is paired with a Y axis receiver R (23). Each X axis emitter E (22) is paired with an X axis receiver R (24). The Y axis emitters E (21) are continuously scanned to produce IR beams or modulated light pulses (25) that are detected by the Y axis receivers R (23). When a finger or stylus enters the grid, it prevents the Y axis receivers R from receiving the IR beam (25) at that point. The beam (25) is broken or interrupted by the stylus. Because the Y axis emitters E are scanned in a controlled order by a microcontroller or microprocessor (not shown), it is easily determined which beam corresponding to a Y axis coordinate is broken. After a beam break is detected in the Y axis, a similar scan is initiated in the X axis to determine the X coordinate. After the X and Y axes coordinates are determined, they are reported to the host computer. In other embodiments, the X and Y axes are scanned simultaneously. For a small screen size of about 10 inches diagonal, the circuit board may be formed of a single piece comprising and forming a frame around the display. For relatively small size displays, small surface mount components may be used because strong beam strength is not required to travel across the short distance.

Figure 3:
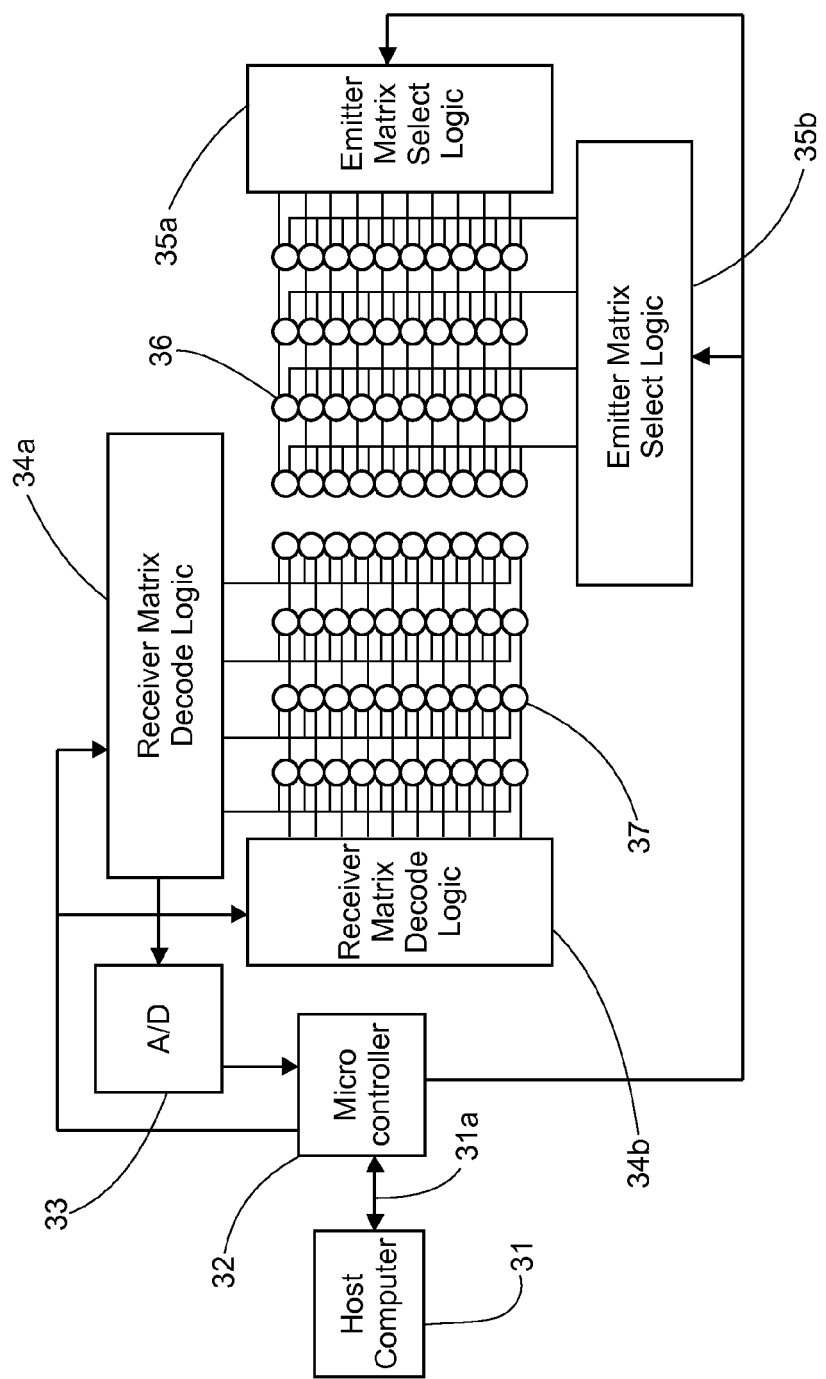
FIG. 3 is a prior art block diagram of a touch system.

FIG. 3 shows a prior art schematic diagram of the IR touch system. The microcontroller (32) controls communication with the host computer (31) and interface (31a) such as RS232. The microcontroller (32) further controls the scanning of the emitters E through the emitter matrix select logic (35a, 35b) composed of circuits for selecting and for driving the emitters E (36).

The receivers R (37) are polled through the receiver matrix decode logic, (34a) and (34b) composed of a series of multiplexed (i.e., 16:1) analogue decoders. The output from receiver matrix and decoder logic (34a) is digitally converted by serial A/D conversion circuit (33). The output of the A/D conversion circuit (33) is sent to the microcontroller (32) where it is subtracted from a previously obtained ambient reading. An individual ambient reading may be obtained for each receiver R (37) at power up, immediately prior to the emitter E (36) it is paired with is activated, or just after the emitter E (36) it is paired with being activated.

The emitter E (36) is paired with a receiver R (37). The emitter E and receiver R pairs are discrete elements, and thus the IR touch screen has limited resolution. Infrared touch screens are usually limited in resolution detecting a stylus with a diameter of about one-half the distance between centers of the LEDs. Thus an IR touch screen with LED spacing of 0.25 inch can detect a stylus of 0.125 inch or greater.

In a large touch screens, slight imperfections in the LEDs such as the centering of the beam are magnified due to the large distance the beam must travel before it is detected. To eliminate the problems caused by imperfections, more current is provided to the LEDs. LED emitters produce light proportional to the current they receive. However, the greater the current, the shorter the life of the LED. This in turn decreases the life of the touch screen. It is desirable to provide enough current to allow the touch screen to function properly without unnecessarily shortening the life of the screen.

In the case of large touch systems it is desirable to optimize the current based on the length the emitter beam must travel to the receiver board. For example, in a 42-inch diagonal display, the light from emitter boards on the X axis must travel about 2 feet, and on the Y axis it must travel about 3 feet. It is not necessary to drive the X-axis emitters at the same high current as the Y-axis emitters. It is desirable to drive the X axis emitters at a lower current the Y axis emitters.

Figure 4:
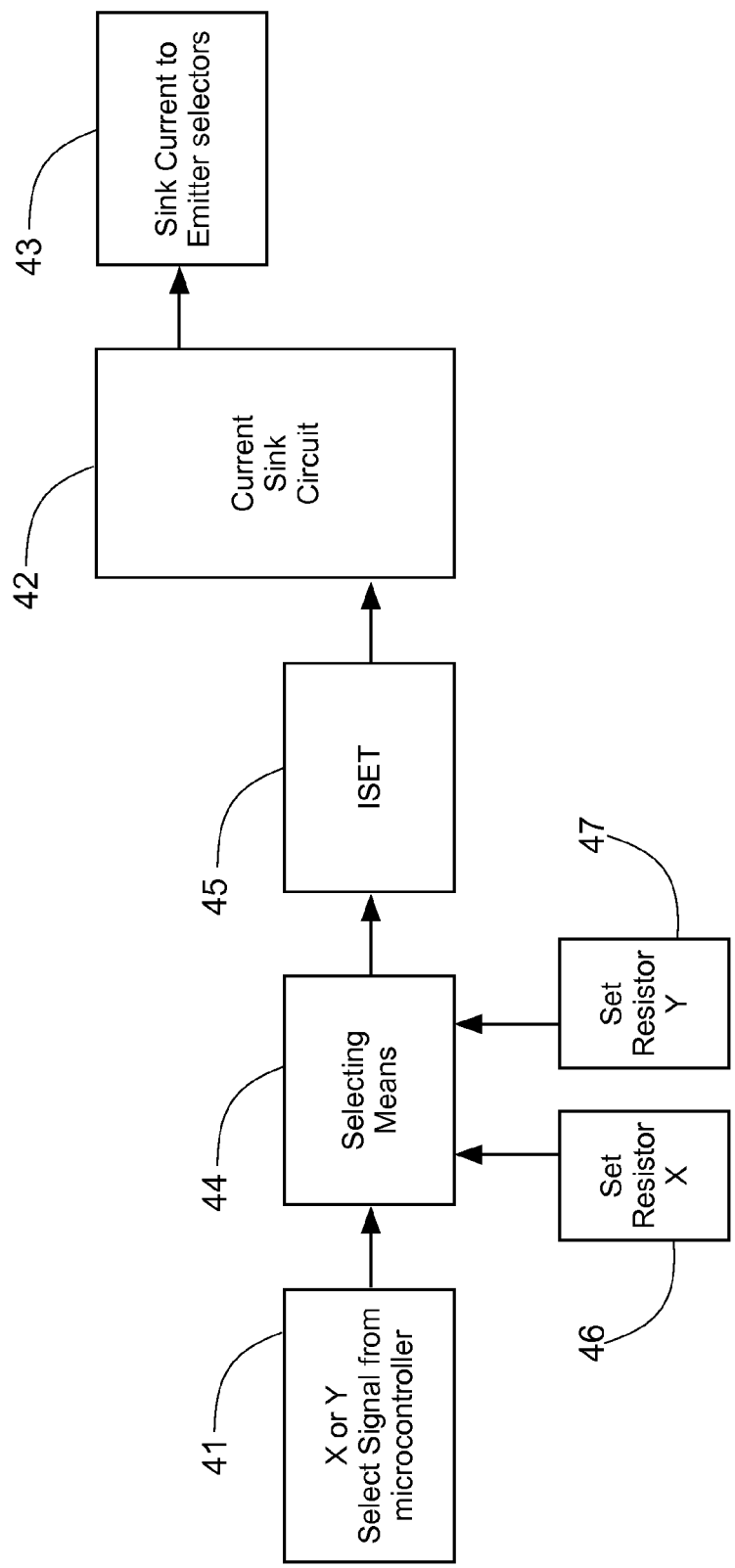
FIG. 4 is a circuit for controlling the current of the infrared photo emitters.

In accordance with this invention, FIG. 4 shows a circuit that accommodates two different current settings of the X and Y axes. FIG. 4 shows a block diagram that allows for different current levels to be applied to the emitters E of the X and Y axis (43). A standard "Current Sink Circuit" (42) sets the emitter current (43) according to the voltage level of "ISET" (45). The voltage level "ISET" (45) is controlled by one of two "Set Resistors" (46) and (47), which are selected by a "Selecting Means" (44). The "Selecting Means" (44) is controlled by the "X or Y Select Signal" (41) generated by a microcontroller (not shown).

Increased Resolution

The prior art such as U.S. Pat. No. 6,429,857 (Masters et al) describes methods of off axis scanning that allows for increased touch resolution specifically by scanning to locate a coarse touch X and Y location and refining it with an off axis scan based on the coarse scan.

This method requires that a coarse location be reported for the X and the Y before a fine scan is initiated. However, in the case of a long fingernail, used as a stylus, the fingernail is wide on one axis, and narrow on the other axis. The wide axis may be one-quarter inch and the narrow axis may be as thin as a one-sixteenth of an inch. If a fingernail enters the IR field, the touch screen will report a break for one axis, but not necessarily for the other.

Figure 5:
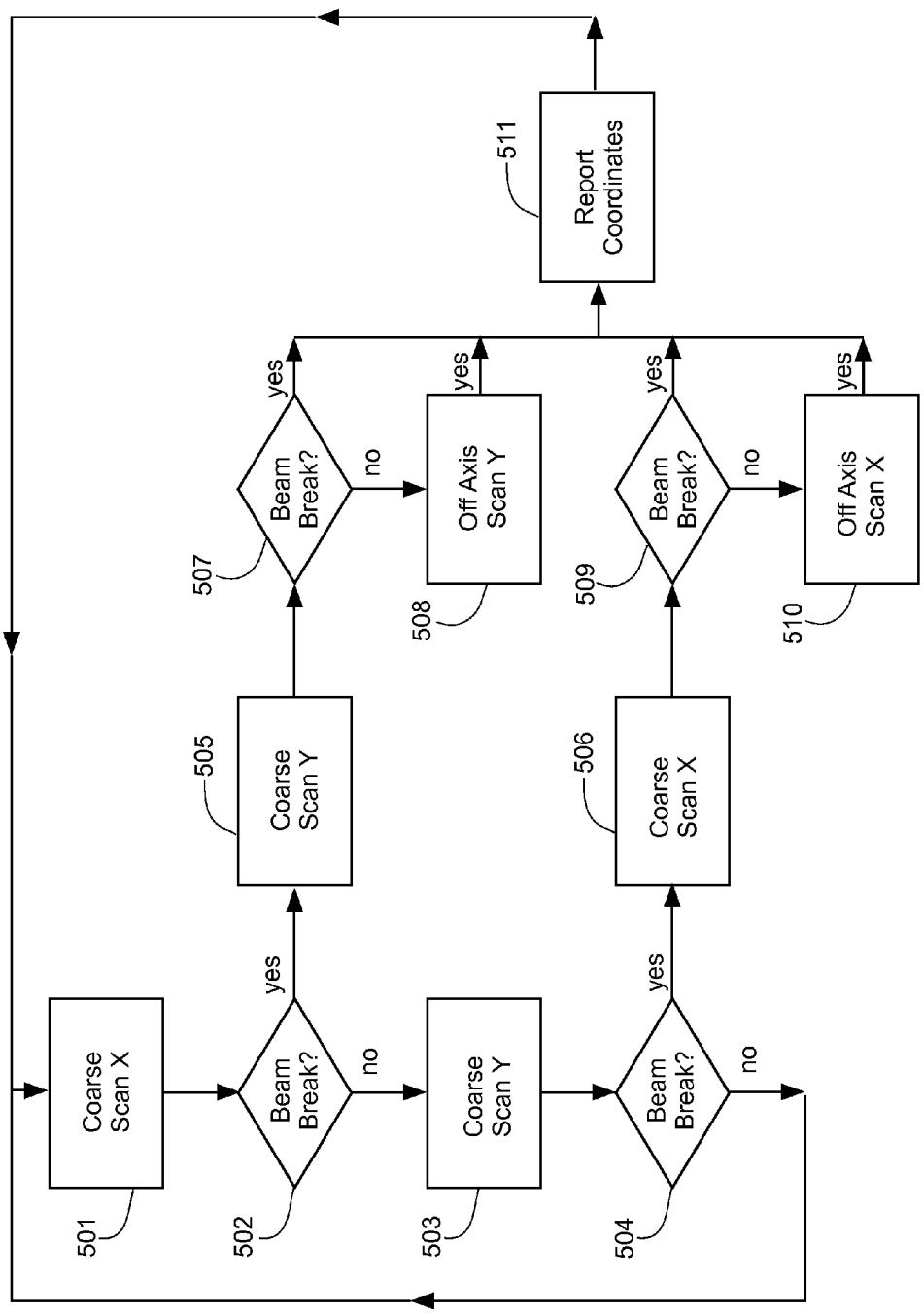
FIG. 5 is a block diagram of a method to use axis scanning to detect a small object in an infrared touch area

In accordance with this invention, FIG. 5 shows a method of scanning a touch screen to detect for a fingernail whereby the X axis is continuously scanned in a vertical direction and the Y axis is continuously scanned in a horizontal direction. If the X axis receiver detects a touch and the Y axis receiver detects a touch, a coordinate is reported. If the X axis receiver detects a touch and the Y axis receiver does not detect a touch, a fine scan (off axis scan) is initiated in the X axis or the Y axis or both axes to triangulate a point and determine the Y axis coordinate. If the Y axis detects a touch and the X axis does not detect a touch, a fine scan (off axis scan) is initiated in the Y axis, or the X axis, or both axes to triangulate a point and determine the X axis coordinate.

More specifically, the process begins with a coarse scan of X axis emitter and receiver pairs (501). After a single coarse X axis scan, a beam break will be detected or it will not be detected (502). If an X axis break is not detected, a coarse Scan of the Y axis is initiated (503). After a single coarse scan of the Y axis is completed, a beam break will either be detected or not be detected (504). If no beam break is detected, the process begins again with a coarse scan of the X axis (501).

If a beam break is detected after completing a coarse scan of the X axis, then a coarse scan of the Y axis is initiated (505). Because a beam break was detected in the coarse scan of X axis, it is expected that a beam break will be detected in the coarse scan of the Y axis. If beam break is detected (507), the X axis and Y axis coordinates are reported (511). However, if a beam break is not detected as expected at (507), an off axis Y scan is initiated at (508) and the results of this scan are used to report the X and Y axes coordinates (511).

If a coarse scan of the Y axis (503) results in a beam break (504) without a coarse scan of the X axis (501), a coarse scan of the X axis is initiated (506). If this scan does not result in a beam break (509), an off axis scan of the X axis (510) is initiated and the results reported (511).

Figure 6:
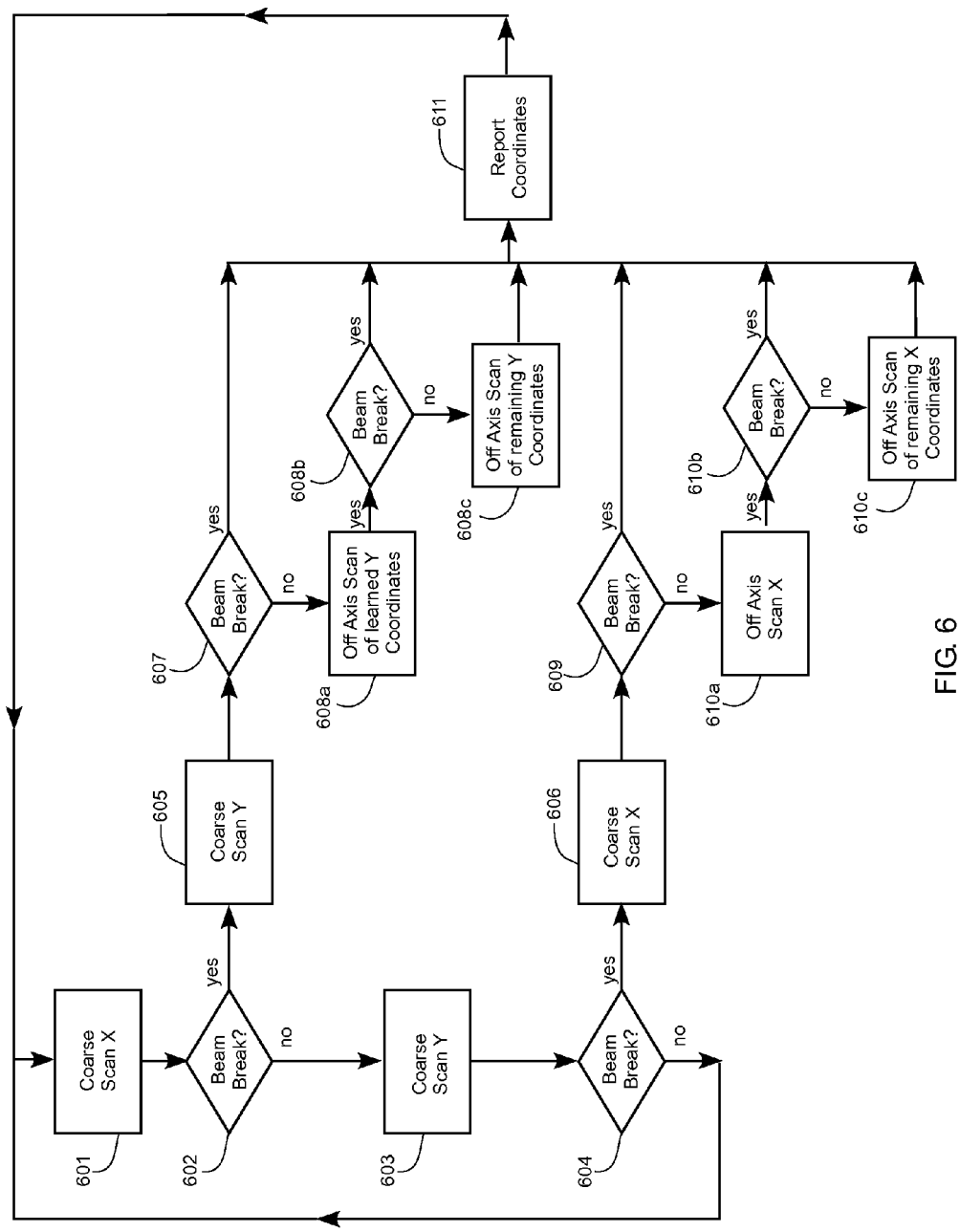
FIG. 6 is a block diagram of process to use off axis scanning to detect a small object in an infrared touch area in which focus is placed on likely areas to be touched

To eliminate needless fine scanning, the system may further be improved by employing a learning algorithm in which the microprocessor "learns through experience" where the most likely touch locations are and provides a fine scan at those places first. This is especially useful for kiosks or other applications in which the same positions are touched constantly. If buttons (or touch locations) are known in advance, these may be preprogrammed into the touch system and thus eliminate the need to "learn". FIG. 6 shows this scanning with a learning algorithm.

More specifically, the off axis scan of FIG. 5, (508) is replaced with the process steps of FIGS. 6, (608a), (608b), and (608c). In FIG. 6, (608a) is an off axis scan of "learned" Y coordinates. These coordinates are the most likely Y coordinates to have a beam break. If a scan of these coordinates does not report a break (608b), the search is broadened to include the remaining Y coordinates (608c). The results are reported (611).

The same learning algorithm is applied to the X axis. In FIG. 6, (610a), (610b), and (610c) replace FIG. 5 (510), (510a), being an off axis scan of "Learned" X coordinates. These coordinates are the most likely X coordinates to have a beam break. If a scan of these coordinates does not report a break (610b), the search is then broadened to include the remaining X coordinates (610c). The results are reported (611).

Figure 7A:
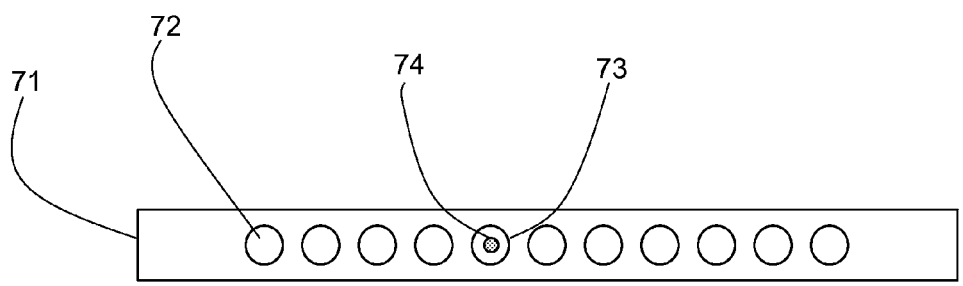
FIG. 7A is a standard photo emitting diode with a concentrated beam in the center

In the prior art, filters may be used to shield IR emitters and receivers from external light. In the embodiment of this invention, a textured optical filter is used to obtain additional resolution. With a smooth optical filter, a thin beam of light is emitted from the center of the emitter. A textured filter will cause the emitted beam projected to the opposing receiver to be wider, to diverge and to be more dispersed. FIG. 7A shows a smooth filter (71), and an inactive and unlit emitter (72). An active or lit emitter (73) has a bright center (74). If a stylus is inserted off center of the beam concentration, an insignificant amount of light will be blocked from the receiver. Thus the stylus will not be detected.

Figure 7B:
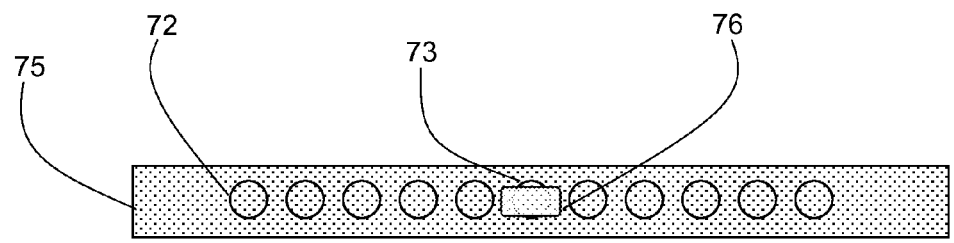
FIG. 7B shows the effect of a dispersing filter used to defocus the light concentration

FIG. 7B shows the effects of a textured optical filter (75) that is shown as a dotted body. The active or lit emitter (73) has a more dispersed and homogenous light output (76). If a stylus breaks a beam slightly off center, the result will be a larger amount of light blocked from reaching the emitter. Thus the stylus will be detected.

Figure 8:
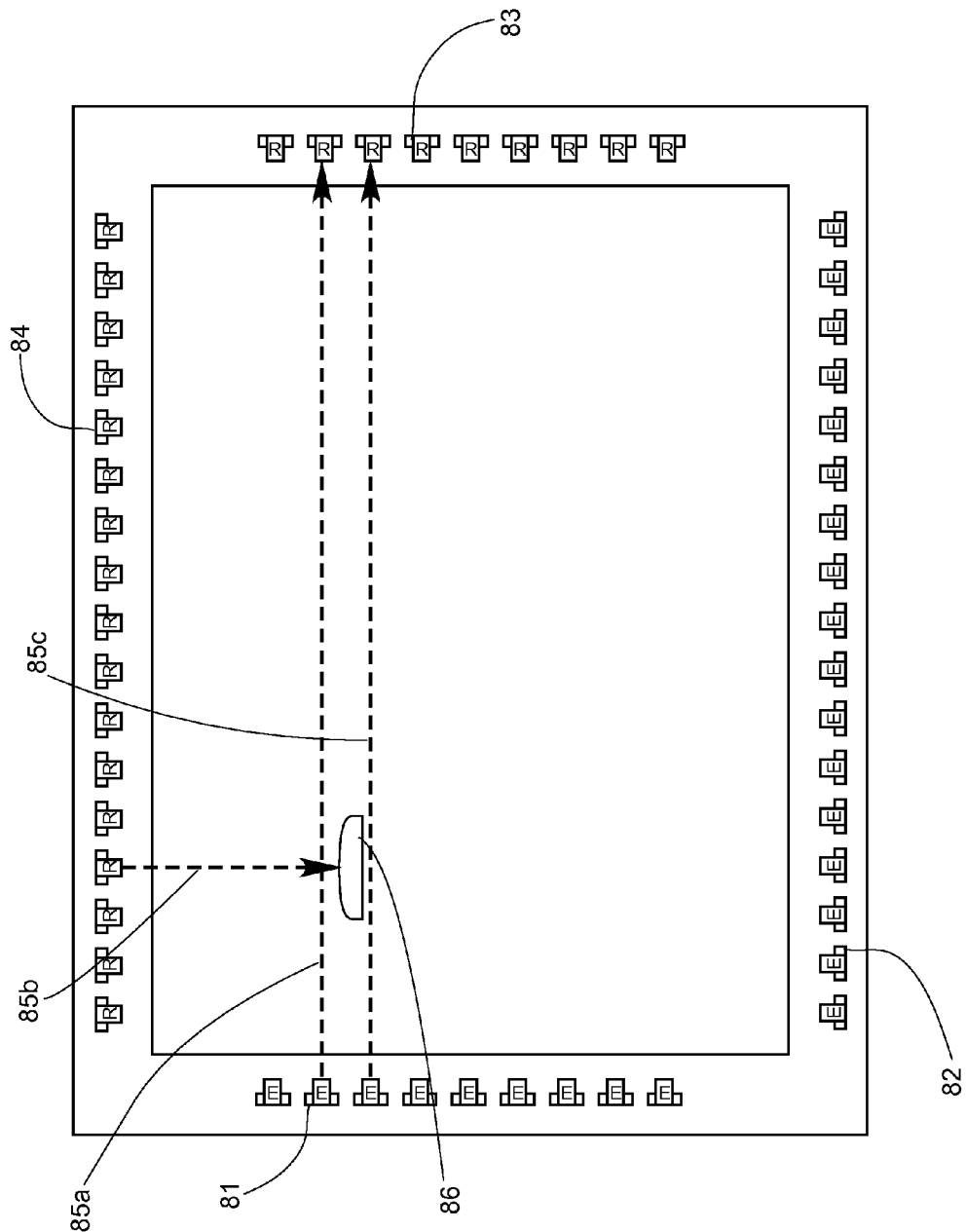
FIG. 8 shows a fingernail in the area of a standard touch screen
Figure 9:
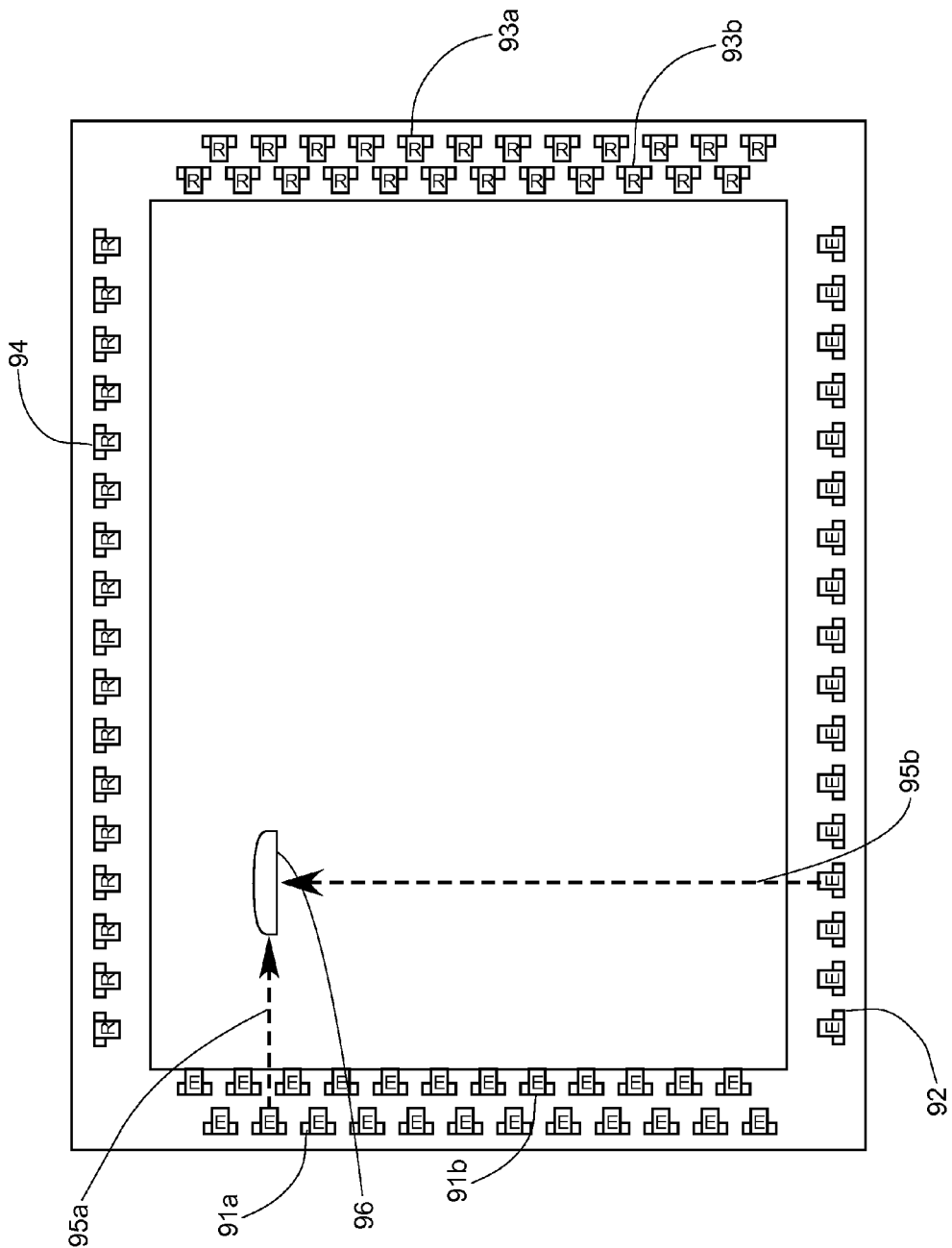
FIG. 9 shows a fingernail in the area of a touch screen in which emitters and receivers pairs have been zigzagged to increase resolution in one axis.

FIG. 8 shows surface mounted emitters E (81, 82) and surface mounted receivers R (83, 84). In FIG. 8 a fingernail (86) is wide in one axis (X axis) and narrow in another axis (Y axis). In a typical IR touch screen, when a fingernail enters a touch screen, with emitter E receiver R pairs spaced nominally, about one-quarter of an inch apart, it will likely interrupt or break beam (85b) in one axis, the X axis in this orientation. The finger may not break beams on the Y axis (85c). However, if the resolution in the Y axis is increased so that emitter E receiver R pairs are spaced closer together, nominally about one-eighth of an inch apart as is shown in FIG. 9, detection of the fingernail in the Y axis will be more likely. Surface mount emitters E and receivers R are commercially available in a standard surface mount size package, which easily allows for about one-eighth inch spacing. The resolution may be doubled nominally to about one-sixteenth of an inch if the surface mounted emitters E and receivers R are zigzagged as shown in FIG. 9.

FIG. 9 shows surface mounted emitters E (91a, 91b) on the Y-axis and emitters E (92) on the X-axis. The emitters E (91a) are off-set and mounted behind the emitters E (91b). The surface mounted receivers R (93a, 93b) are on the Y-axis and the receivers R (94) are on the X-axis. The receivers R (93a) are offset and mounted behind the receivers R (93b). This results in higher resolution on the Y-axis. Thus a fingernail will likely break or interrupt a beam (95a and 95b).

Touch Screen Layout

Touch screens are generally laid out with a grid of X and Y LED emitter E and receiver R pairs around the periphery of a display. Generally they are placed on a circuit board of rigid material produced in the shape of a "picture frame" as shown in FIG. 2.

This is a rigid structure that does not easily conform to the curved surface of a CRT. Also the process to produce the circuit board is a batch process and does not lend itself to a low cost process. Additionally there are commercial manufacturing limits to the size of a touch screen made in the shape of a picture frame.

Figure 10A:
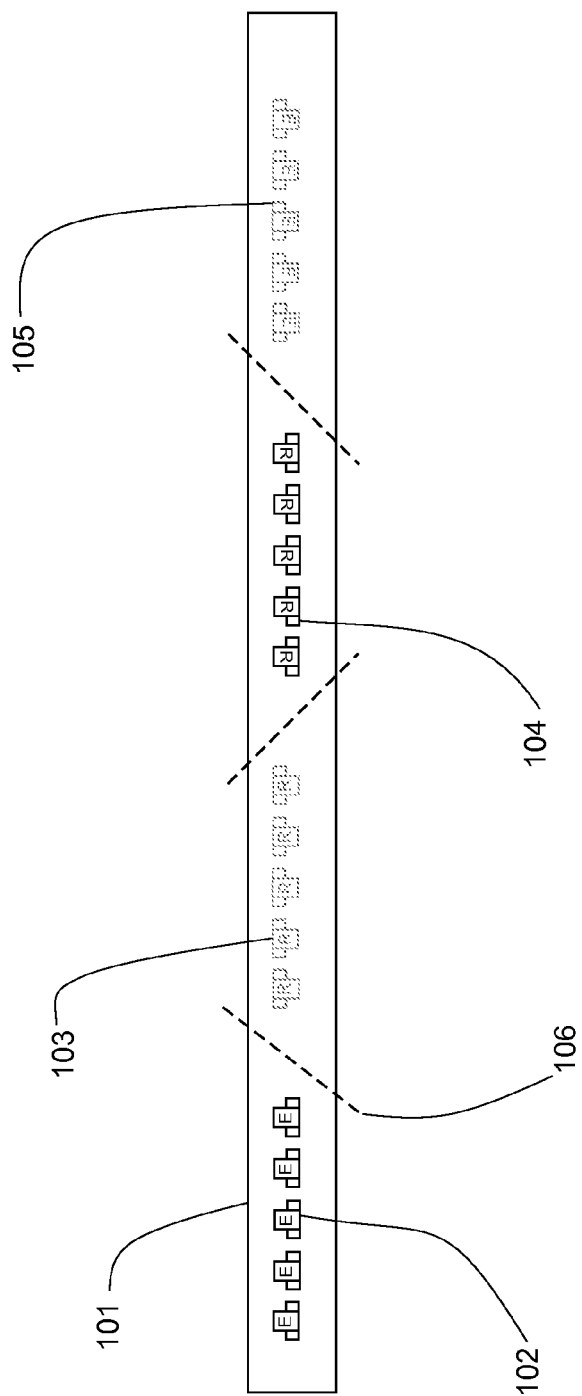
FIG. 10A shows a flexible strip populated with emitters and receivers that may be folded to define a touch area FIG. 10B show the flexible strip folded into a touch array
Figure 10B:
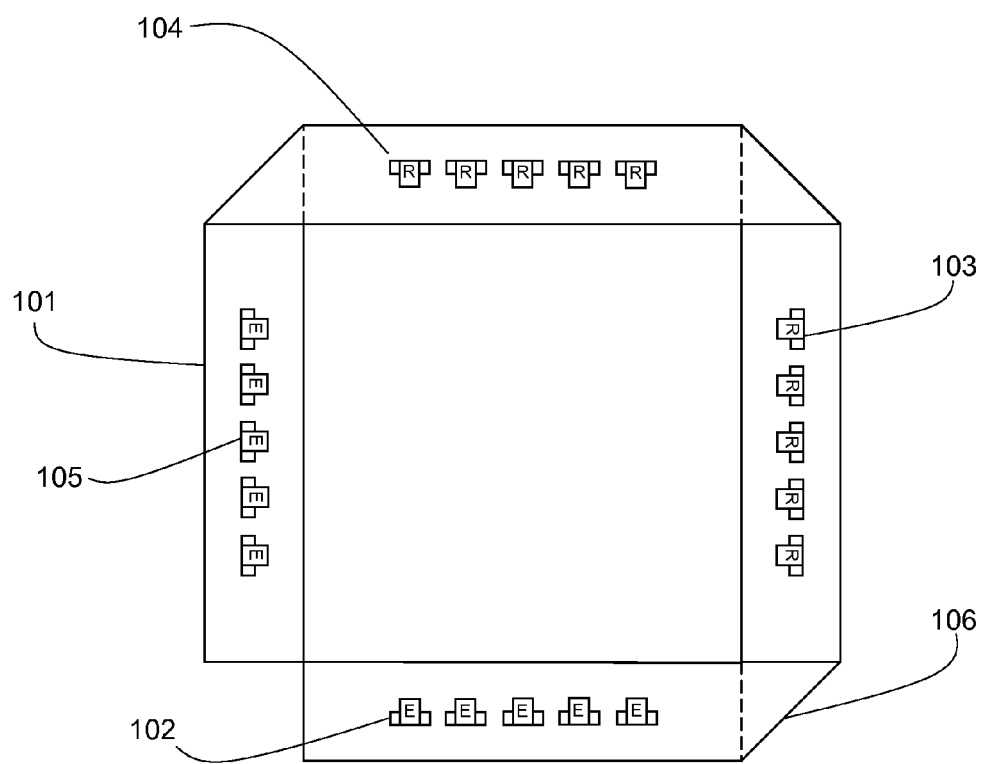

In accordance with this invention, the rigid circuit board material is replaced with a flexible substrate such as Kapton, Mylar or other material known in the industry. FIG. 10A shows a front view of an elongated strip of flex circuit (101) with LED emitters E (102) and receivers R (104) positioned in the front and LED receivers R (103) and emitters E (105) shown in gray and positioned on the back of the flex circuit. The dotted diagonal lines (106) indicate fold lines for making the flex circuit into a frame. It should be noted that FIG. 10A only shows emitters E and receivers R. Other support components including scan circuitry and the microcontroller may also be added to the flex circuit. FIG. 10B shows the flex circuit in FIG. 10A folded into a touch frame. After folding, all emitters E and receivers R are on the same side of the frame formed by the folding of the flex circuit (101).

Prior art touch screens are made up of four sides in the shape of a square or rectangle. Two of the sides contain rows of LED IR emitters and two of the sides contain rows of LED IR receivers R also called photo receivers R. The emitters E are paired with the receivers R to form an X-Y grid. When an object is placed in the grid area, beams of light are obstructed in the X and Y-axis. Through the proper control circuitry, the X-Y coordinate defined by the broken beams is reported to the computer or other host device.

Pairs of receivers and emitters are prone to certain types of failures. For example an emitter may fail and not emit IR light when activated. Alternately, a photo detector or receiver R may fail and not detect the IR beam from the emitter. Both failures show up as a continuous broken beam. Additional diagnostics must be performed to determine if the emitter has failed or the receiver has failed. One possibility is to perform an off axis test, by using the neighbor of the detector in question to detect the beam of the emitter in question. An off axis test may also be performed by using the neighbor emitter to produce a beam for detection by the receiver in question. This has a disadvantage because often emitters E and receivers R are controlled in contiguous banks of 8 or 16 pairs. In this case, if there is a problem with the control logic, the off axis test will fail.

Figure 11:
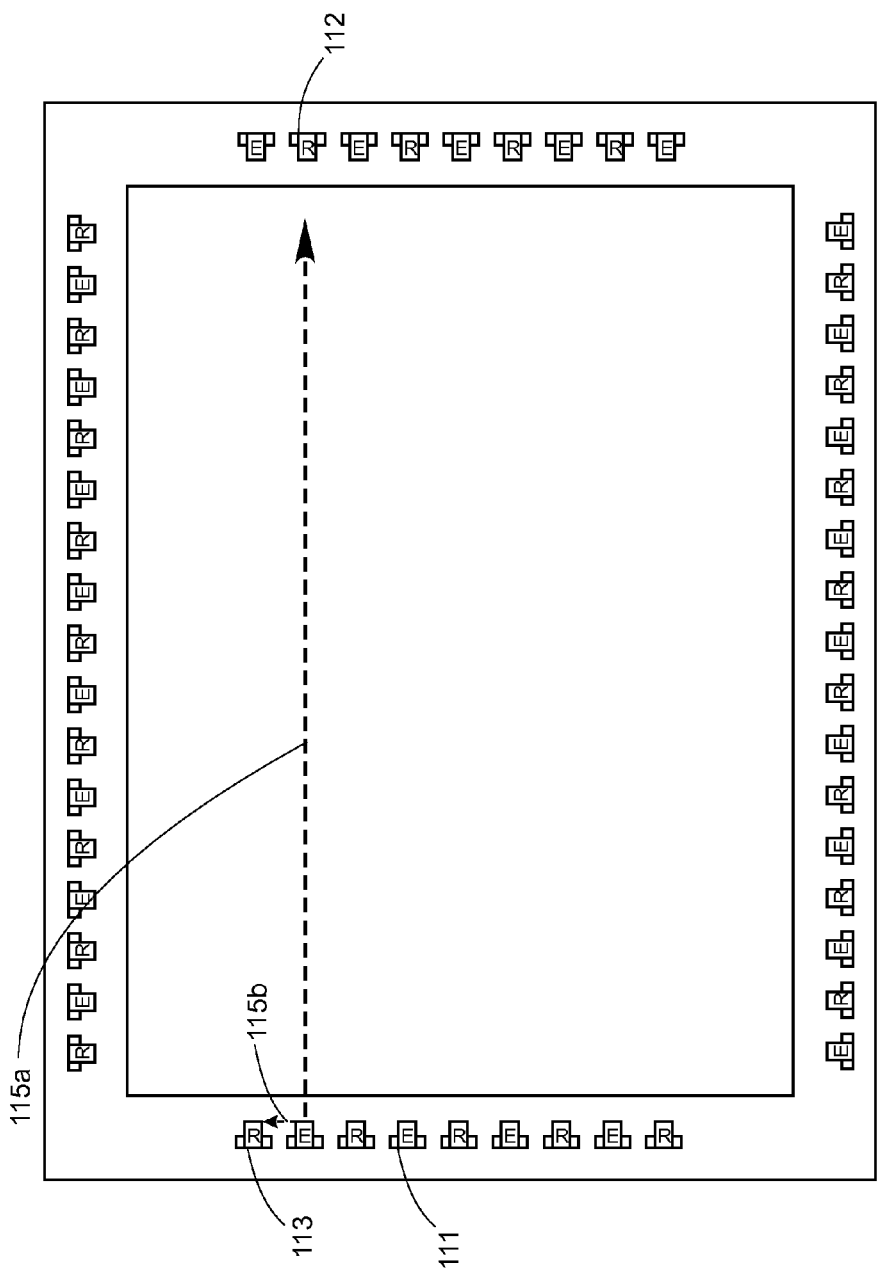
FIG. 11 shows emitters interspersed with receivers to aide in troubleshooting

One method to eliminate this problem is to intersperse emitters E and receivers R on the same side such that every other component is an emitter E and every other component is a receiver R as shown in FIG. 11. When an emitter E (111) is activated, the beam (115a) may be detected by a receiver R (112) directly across from it and also by one of its nearest neighbors, a receiver R (113) by means of a cross talk beam (115b). If the receiver R (112) directly across from the emitter E (111) fails to detect the beam (115a), a further check may be performed with the neighbor receiver R (113) to determine if the emitter E (111) actually fired. The same check may be performed with the receivers R. If a receiver R is unable to detect an emitter E across from it, but can detect light from its nearest emitter E neighbor, it can be concluded that there is an obstruction or that the emitter has failed.

FIG. 12A shows a layout of daisy-chained emitter and receiver boards as practiced in this invention of a large area touch screen for large area displays. FIG. 12B shows a single emitter board (121) used in the daisy-chain layout and configuration of FIG. 12A. These are shown with through-hole mounting of emitters E and receivers R, but surface mounting may be used as shown above in FIG. 11. An array of through-hole diode emitters E (129) is populated in a row along the edge of the emitter board (121). An array of through-hole diode receivers R is similarly populated in a row along the edge of a receiver board.

In the preferred embodiment receiver and emitter diodes are populated at a right angle to the circuit board as shown in FIG. 12A. This allows for ease of populating the diodes on the circuit board. The circuit board through-holes also act to align the diodes. Both emitter board and the receiver board have connectors on either end, for example (127) and (128) for emitter board (121). When an emitter board (121) or receiver board (124) is connected to another board in the same plane, as shown in FIG. 12A, a connector (127), is used. When a board is connected to a board in a different plane with connector (128), a flex connector or cable (122) is used. The flex cables (122) used with the flex connector (128) make it possible to round corners when assembling the layout in FIG. 12A. This also makes it easy to accommodate different display sizes without fabrication of different size circuit boards.

As shown in FIG. 12A, emitter boards (121) and receiver boards (124) are daisy chained together to form a ring around the active area of the display. The dimension of the emitter and receiver boards is selected to be easily manufactured by any circuit board manufacturer. The receiver boards and emitter boards are designed with a minimum of components to reduce the number of trace layers required for the circuit board. In the preferred embodiment, the number of trace layers is two. Decode Logic, Emitter Matrix Select Logic, a microcontroller, and the A/D conversion circuitry reside on the controller board (123). A remote controller board (123a) may be provided with the Decode Logic and the A/D conversion circuit. It is shown in FIG. 12B as connected to board (123) via connection (123b). In one embodiment, it is placed on the receiver board (124) connected to board (123) via connection (122). The controller board (123) also has an array of emitter LEDs the same as board (121). It is opposite to and corresponds to receiver board (126). Both of the boards (123) and (126) may be of the same or different length as boards (121) and (124). Because of the added circuitry, the controller board (123) is somewhat more complex than either the receiver boards (124) or the emitter boards (121). Thus it has more trace layers and may also be slightly larger than the board (121). In the preferred embodiment, there is one controller per system. The boards (121), (124), and (126) may be referred to as daughter boards.

Each through-hole emitter or receiver package has wire leads which insert into holes within the circuit board. Each emitter or receiver is spaced slightly above the circuit board and may be adjusted by bending the lead wires for better alignment with the opposing emitter or receiver.

FIG. 12A shows a typical layout of a touch screen for a 42-inch diagonal display with a 9:16 aspect ratio. The typical active area (130) is approximately 36 inches×20 inches. Thus at least 36 inches of emitter-receiver pairs are required for the Y-axis and at least 20 inches of emitter-receiver pairs are required for the X-axis. In this illustration, the board (126) is nominally 12 to 14 inches and the two receiver boards (124) are nominally 12 inches for a total of 36 inches on one side of the display. They are paired with two 12-inch emitter boards (121) and one 12 to 14 inch controller board (123) on the opposite side. The Y-axis is made up of two 12-inch receivers (124) opposite two 12-inch emitters (121). LED/receiver pairs that fall outside the active area of the display are surplus and are ignored.

Although a microcontroller has been disclosed for the practice of this invention and its various embodiments, a microprocessor may also be used. As defined herein, a microcontroller has internal or built-in I/O (Input/Output) whereas a microprocessor has external I/O. In the Claims, controller is used to mean microcontroller, microprocessor and or any other computer means. As disclosed herein, this invention is not to be limited to the exact forms shown and described. Modification and changes may be made by one skilled in the art within the scope of the following claims.

The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims to be interpreted in accordance with the breadth to which they are fairly, legally, and equitably entitled.

The invention claimed is:

1. In a touch screen system comprising two perpendicular axes populated with opposing photo emitters and photo receivers, wherein the system comprises a controller that controls pulsing of the photo emitters, polls an analog output from the photo detectors, decodes the analog output from the photo detectors, and reports corresponding coordinates to a host computer, and a series of daughter boards daisy chained together that include a chain of emitter boards, each emitter board having the capability of receiving data control signals from the controller or another emitter board, and each emitter board having the capability of transmitting said data control signals to other emitter boards in the chain, and a chain of receiver boards, each receiver board having the capability of receiving and sending data control signals from the controller or a receiver board, and each having the capability of transmitting said data control signals to other receiver boards in the chain, the improvement wherein there is a remote controller board with decode logic and A/D conversion circuit which sends and receives data to and from the controller and receiver boards, wherein an off axis scan on one axis is initiated by a prior course scan on one axis in which no break is detected and a prior course scan of the perpendicular axis in which a break is detected.

2. The system of claim 1 wherein the controller controls the current supplied to each photo emitter based on the distance between the photo emitter and its opposite photo detector.

3. The system of claim 1 wherein the photo emitters and photo detectors are in thorough-hole packages with connecting leads inserted into holes on a circuit board, each device being mounted perpendicular or parallel to the circuit board such that the body of each device is spaced slightly away from the circuit board and such that the alignment between opposing pairs of photo emitter and photo detector pairs across an axis is optimized by bending the connection leads so as to adjust the position of a photo emitter or photo detector.

4. The system of claim 1 wherein the controller, emitters, and receivers are positioned around the periphery of a display.

5. The system of claim 1 wherein the daisy chained boards wrap around the periphery of a display or display active area with flexible cable connectors.

6. The system of claim 1 wherein the controller is a microcontroller or a microprocessor.

7. The system of claim 1 wherein one perpendicular axis is longer relative to the other perpendicular axis.

8. The system of claim 7 wherein the electronic circuitry for operating the system comprises a current sink circuit controlled by a controller such that when the longer axis is being addressed, the current provided to photo emitter on the longer axis is less than the current provided to the photo emitters on the shorter axis.

9. The system of claim 1 wherein an optical filter is located between each pair of opposing photo emitters and photo receivers.

10. The system of claim 9 wherein the optical filter has a roughened surface.

11. The system of claim 9 wherein each photo receiver has a roughened surface.

12. The system of claim 8 wherein the electronics circuitry is mounted on a flexible substrate.

13. The system of claim 12 wherein the flexible substrate is an elongated strip folded around the active area of the display.

14. The system of claim 1 wherein the photo emitters and photo receivers are interspersed on each axis such that a photo emitter may be detected by a photo receiver adjacent to it as well as across from it and a photo receiver may receive light from a photo emitter directly across from it and from a photo emitter adjacent to it.

15. The system of claim 1 wherein increased resolution detection is provided on at least one axis by populating the axis with at least two rows of photo emitter and photo receiver pairs on each side of the axis, each row being offset from the other such that one row is not blocked by the other row.

16. The system of claim 1 wherein the off axis scan is performed in the most likely or favored areas to be touched.

17. The system of claim 16 wherein the most likely or favored areas are preprogrammed into a controller.

18. The system of claim 17 wherein the most likely or favored areas to be touched are those areas previously touched, said touch areas being stored in the controller with a learning algorithm being used to determine where the most likely touches will occur.

19. An IR touch screen system comprising two perpendicular axes populated with opposing pairs of LED photo emitters and LED photo receivers, wherein IR photons are transmitted from a photo emitter to an opposing photo receiver, a series of daughter boards daisy chained together characterized by a chain of emitter boards containing photo emitters, each having the capability of receiving data control signals from a controller board or another photo emitter board, and each having the capability of transmitting said data control signals to other emitter boards in the chain, a chain of receiver boards containing photo receivers, each having the capability of receiving and sending data control signals from the controller board or a receiver board, and each having the capability of transmitting said data control signals to other receiver boards in the chain, and a controller which pulses the photo emitters, polls the analog output from the photo detectors, decodes the analog output from the photo detectors, and reports corresponding coordinates to a host computer, and a remote board with decode logic and A/D conversion circuit that sends and receives data to and from the controller and receiver boards and wherein an off axis scan on one axis is initiated by a prior course scan on one axis in which no break is detected and a prior course scan of the perpendicular axis in which a break is detected.

* * * * *